United States Patent [19]

Prindle

[11] Patent Number: 4,945,739
[45] Date of Patent: Aug. 7, 1990

[54] BICYCLE LOCK

[76] Inventor: Carl E. Prindle, 140 Marlboro St., Boston, Mass. 02116

[21] Appl. No.: 360,052

[22] Filed: Jun. 1, 1989

[51] Int. Cl.⁵ .............................................. E05B 71/00
[52] U.S. Cl. ........................................ 70/233; 70/227
[58] Field of Search ................ 70/227, 233, 226, 225, 70/236

[56] References Cited

U.S. PATENT DOCUMENTS

| 589,869 | 9/1897 | Stearns | 70/227 |
|---|---|---|---|
| 616,845 | 12/1898 | Johnson | 70/226 |
| 710,576 | 10/1902 | Hann | 70/227 |
| 3,844,146 | 10/1974 | Fouces . | |
| 4,114,409 | 9/1978 | Scire . | |
| 4,571,965 | 2/1986 | Leruoux . | |

FOREIGN PATENT DOCUMENTS

| 162437 | 7/1905 | Fed. Rep. of Germany | 70/227 |
|---|---|---|---|
| 938532 | 2/1956 | Fed. Rep. of Germany . | |
| 261123 | 9/1926 | Italy . | |
| 13787 | 10/1910 | Netherlands . | |

Primary Examiner—Robert L. Wolfe
Attorney, Agent, or Firm—Fish & Richardson

[57] ABSTRACT

A bicycle lock is provided having a base and a locking bar. The locking bar is movable about multiple axes, without removal from the base, from a storage position, clear of the rider's legs to avoid obstruction while pedaling to a locked position, which obstructs the wheel and immobilizes the bicycle. In preferred embodiments, the lock may be formed of multiple portions which are locked and non-removeable from the base when the lock is in the locked position.

17 Claims, 4 Drawing Sheets

4,945,739

BICYCLE LOCK

FIELD OF THE INVENTION

This invention relates to locking devices and more particularly relates to locks for bicycles.

Bicycle locks of the kind preventing rotation of a wheel are known.

Leruoux, U.S. Pat. No. 4,571,965 discloses a bicycle lock including a clamp member which allows the lock to be secured to a tubular frame. The lock also includes a shackle which has a portion adapted to interfere with the spokes of a wheel. To lock the cycle the shackle is inserted into associated openings in the clamp member.

Scire, U.S. Pat. No. 4,114,409, discloses a lock assembly for a bicycle tire quick release mechanism which, when locked, prevents the removal of the wheel from the bicycle even with the quick release mechanism in the release position. The lock includes a rotatable member which engages an extension shaft integral with the lever of the quick release mechanism.

Fouces, U.S. Pat. No. 3,844,146, discloses a bicycle locking device attached to a tubular bicycle frame by a bracket. A plate attached to the bracket holds a pair of jaws extending about the bicycle tire. For locking the tire, a movable jaw is moved toward a stationary jaw by means of a ratchet mechanism.

German Patent No. 938,532, appears to disclose a locking mechanism for bicycles which is fastened to the tubular frame. A curved locking member may be slideably rotated about a tire.

Italian Patent No. 261123, appears to disclose a lock.

Dutch Patent No. 13787, discloses a lock including a curved strap member which rotates 180 degrees between a position about a wheel and a position disengaged from the wheel.

Summary of the Invention

The invention features a bicycle lock with a base member attachable to a frame member of a bicycle near a wheel of the bicyle and a bent locking bar. A rotation assembly is attached to the base and supports the locking bar from a first end of the locking bar. The locking bar extends to a second free end adapted to pass between the spokes of the wheel. The rotation assembly includes means permitting a first motion of the bar about the bicycle frame member to which the base member is attachable, and a second motion at an axis lying at a substantial angle to the frame member. The rotation assembly is constructed and arranged to enable the motions of the bar about both the frame and axis without detachment from the base to move between a storage position in which the bar does not impede operation of the bicyle and a locking position in which the free end of the bar extends through the spokes of the bicycle wheel to prevent rotation of the wheel. A lock mechanism is provided for locking the bar in the locking position.

Another feature is that the free end of the lock may engage with a lock mechanism.

Another feature is that the locking bar and rotation assembly may be cooperatively constructed and arranged to enable removable engagement of the free end of the locking bar with the base when the bar is in the locking position.

In yet another feature, the base may be formed of separable portions and the free end of the bar, in the locking position, is engageable with the base in the manner to immobilize the portions on the frame when the bar is in the locked position.

Yet another feature is that the lock mechanism is disposed on the base and the free end of the bar engages the lock in the locking position.

Another feature is that the lock may include means permitting further a third motion of the outer part of the bar about an axis which lies at an angle to the axis of the second motion for moving into the lock mechanism.

Yet another feature is that the rotation assembly means may include a spherical bearing attached to first end of the bar, and the base may include a complementary sliding track containing the bearing. The motion about the first axis is enabled by sliding the bearing in the track, and the motion about the second axis is enabled by rotation of the bearing in the track.

Another feature is that the locking bar may be articulated at a pivot spaced from the ends and allowing motion of the outer end of the bar relative to the inner end.

Another feature is that the bar may be a hooked shaped bar with one end attached to the base, and the lock locks the bar from the attached end.

Another feature is that the lock may further include a clip for engagement with the second end of the bar when the bar is in the storage position.

The locking member may be a key lock or a combination lock.

Another feature of the invention is a bicycle lock with a base member adapted for attachment to the downtube of a bicycle frame near the rear wheel of the bicycle, a bent locking bar, and a rotation assembly attached to the base and supporting the locking bar at the first end. The locking bar extends to a second free end adapted to pass between the spokes of the wheel. The rotation assembly includes a spherical bearing attached to the first end of the bar and is contained in a complementary sliding track defined by the base for enabling a first motion of the bar about the downtube by sliding the ball in the track and enabling a second motion about an axis at a substantial angle to the downtube, by rotation of the bearing in the track. The rotation assembly further includes a pivot to which the locking bar is articulated. The pivot is spaced from the ends of the locking bar and enables a third motion of the bar about an axis at a substantial angle to the axis of the second motion.

The rotation assembly is constructed and arranged to enable motion of the bar without detachment from the base between a storage position in which the bar does not impede operation of the bicycle and a locking position in which the free end of said bar extends through the spokes of the wheel to prevent rotation of the wheel. The lock further includes a lock mechanism, contained within the base and arranged to engage the second end of the bar when in the locked position.

Another feature is that the sliding track may extend from a position in the plane of the bicycle frame, opposite the wheel, for placing said bar in the plane of the frame in the storage position, to a position out of the plane of the frame near the wheel but not in the plane of the wheel to enable placing the bar in the locking position without obstruction from the wheel.

An advantage of the invention is that the locking bar can be moved from a storage position which is away from the bicycle wheel and clear of the rider's legs while pedaling, to a locking position which obstructs the wheel and immobilizes the bicycle. The bar is moveable but not detachable and need not be removed from the lock when changing from storage to locking position.

These and other features and advantages will be apparent from the following description and a presently preferred embodiment, and from the claims.

DESCRIPTION OF THE PREFERRED EMBODIMENT

The drawings are first briefly described.

STRUCTURE AND USE

Figure 1:
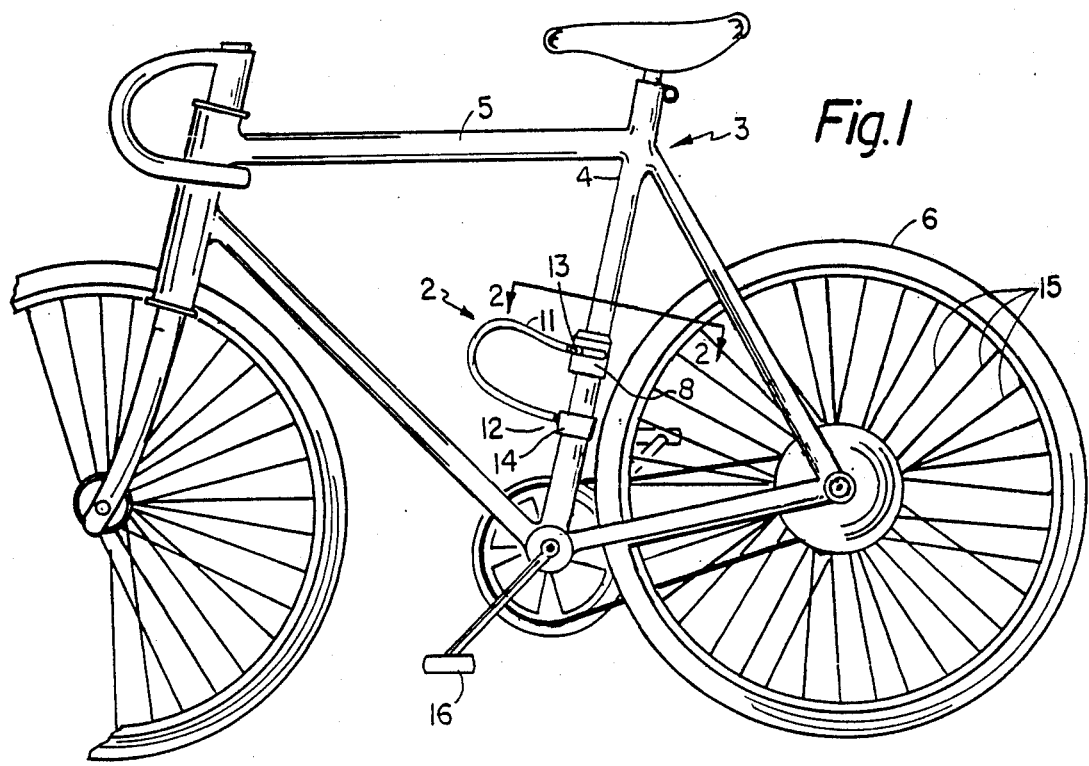
FIG. 1 is a schematic side view of the lock of the invention in the storage position on a bicycle.
Figure 1A:
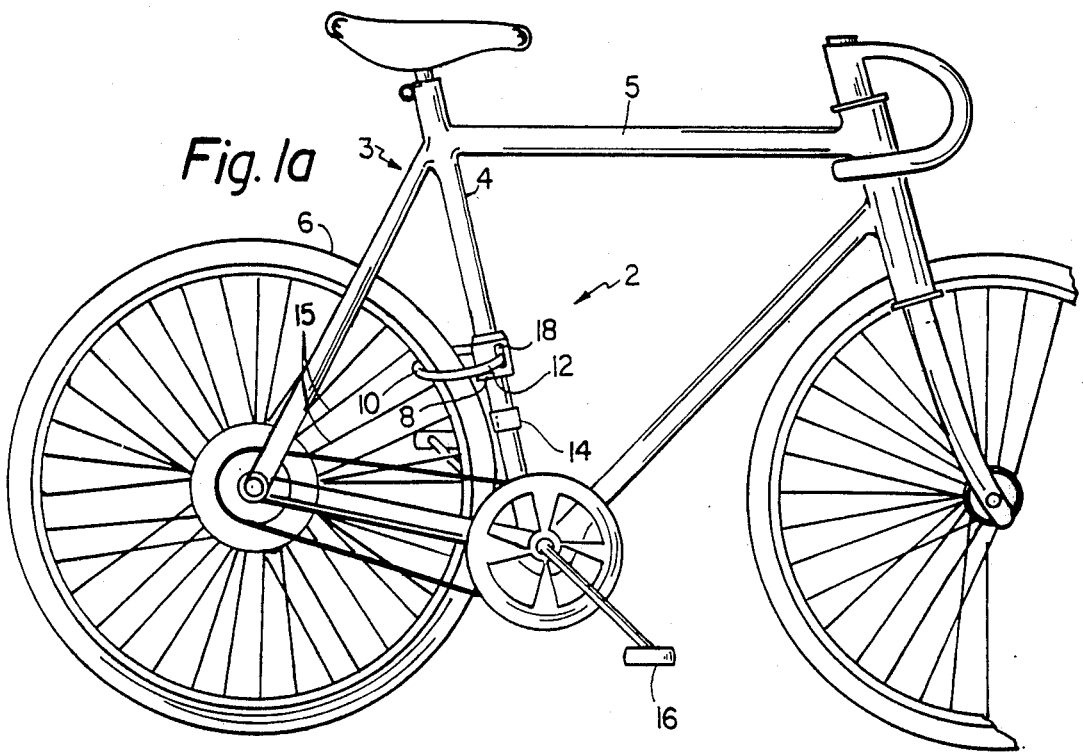
FIG. 1a is the opposite side view of FIG. 1 and with the lock in the locked position.

Referring to FIGS. 1 and 1a, an embodiment of the bicycle lock 2 is shown attached to the downtube 4 of a bicycle frame 3 near the rear wheel 6. The lock includes a base member 8 which is attached about the downtube 4 in a manner to prevent radial or axial motion of the base. A rigid arcuate locking bar 10 is attached to the base at an attachment end 11 through a rotation assembly 13 and is moveable about the base 8. A free end 12 of the bar is removeably attachable from a locking mechanism 18 in the base 8 (FIG. 1a) and from a securing bracket 14 about the downtube 4.

As shown in FIG. 1, the lock may be placed in a storage position with the locking bar positioned opposite the wheel 6 on the downtube 4 and in the plane of the frame. A securing bracket 14 engages the free end 12 of the bar by means of friction or spring clip arrangement or the like. In this orientation, the lock is conveniently out of the way of the wheel, for allowing wheel rotation and the bar does not obstruct or interfere with the rider's legs or clothing while he operates pedals 16.

Figure 3:
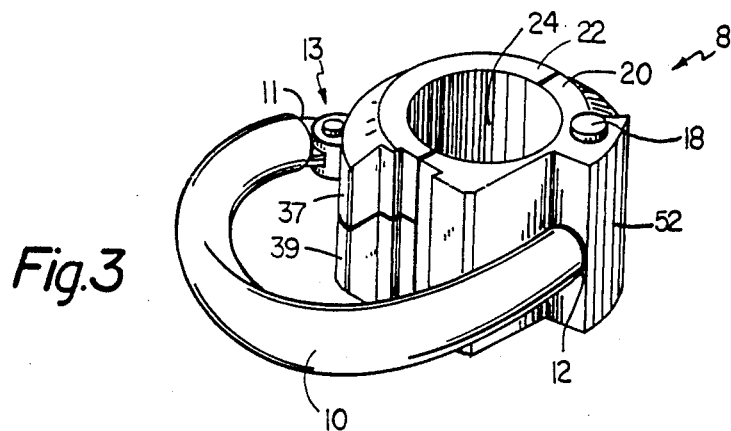
FIG. 3 is a perspective view of a preferred embodiment of the lock.

For locking as shown in FIG. 1a (and also shown in perspective view in FIG. 3 with the lock off the bicycle), the locking bar 10 may be moved from storage to a locking position through the spokes and about the rim of the wheel 6 for engaging the free end 12 of the bar with locking mechanism 18, held within the base 8. The bar 10 thus interferes with the rotation of the rear wheel by extending between the spokes 15 of the wheel and the bicycle is locked and immobilized.

It is a feature of the present invention that the lock does not require detachment or disassembly of any components for moving between storage and locked positions. The locking bar orientation is effective for immobilizing the cycle when locked, yet is completely and conveniently out of the rider's way when stored.

It is another feature of the invention that the base 8 of the lock may be formed of a number of portions that are secured to the frame by the lock. In a preferred embodiment, the base 8 may be formed of two portions with the lock 18 attached to one portion and the attached end 11 of the bar 10 attached to the other portion. With the bar in the locked position, an end of the bar is attached to each portion thus preventing disassembly.

Figure 2:
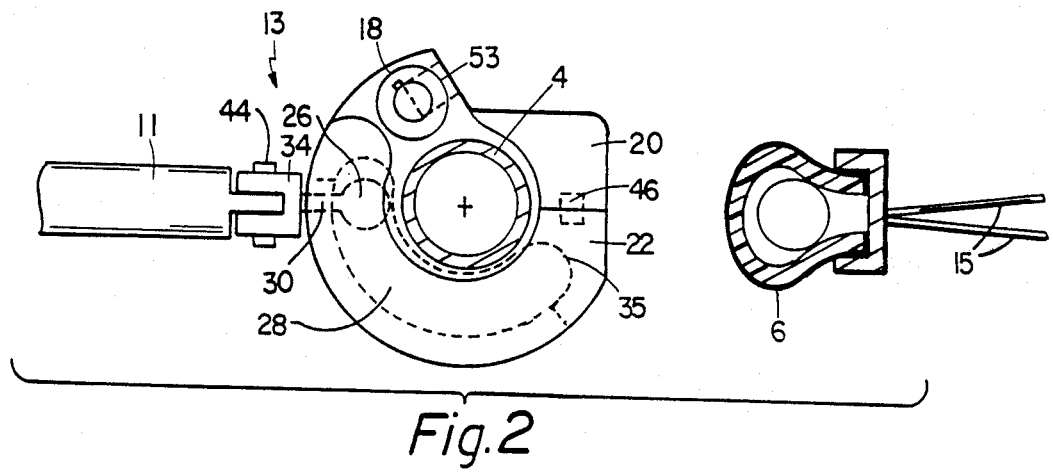
FIG. 2 is a cross sectional view taken along the line AA in FIG. 1.
Figure 2A:
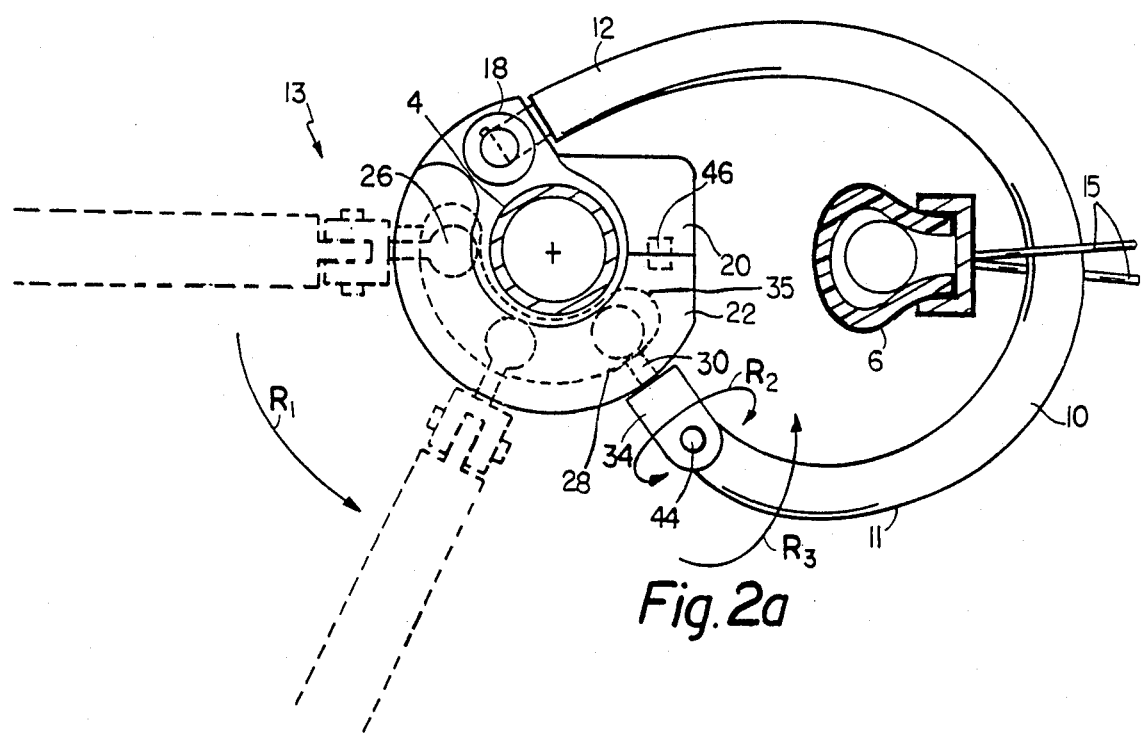
FIG. 2a is a cross sectional view as in FIG. 2 with the lock moved from storage to locking position.

In FIG. 2, the bar is shown in the storage position. In FIG. 2a, the lock is in the locking position. In the preferred embodiment, the locking bar rotation assembly 13 is adapted for three separate, independent motions to position the ends of the bar when moving between locked and storage positions. In a first motion, the bar 10 may be moved about the downtube 4 as indicated in phantom and by the arrow $R_1$ (FIG. 2a). In the preferred embodiment, this motion is enabled by a ball-end bearing 26, to which the bar 10 is ultimately attached, sliding circumferentially in a sliding track groove 28 provided in the base 8. The rotation assembly 13 can be moved to any position about the downtube 4 within the travel of the track groove 28. Typically the bar will be opposite (storage, FIG. 2) the wheel 6 on the downtube 4 or near (locked, FIG. 2a) the wheel 6.

A second motion is at a substantial angle, preferably perpendicular, to the downtube 4 and is indicated by the arrow $R_2$. In the preferred embodiment, this is enabled by rotation of the bearing 26 within the track groove and about the axes perpendicular to the axis of the downtube 4. Preferably, a pin 30 with mating piece 34 is attached and extends from the bearing 26 to the attached end 11 of the locking bar 10. The rotation, i.e., $R_2$, allows the bar to be moved in (storage, FIG. 2) and out (locked, FIG. 2a) of the plane of the frame and wheel.

Finally, a third motion, $R_3$, is about axes at an angle, preferably perpendicular, to the axes of the second motion, $R_2$. This motion is enabled preferably by a pivot pin 44 at a mating end of the piece 34, for pivotably mating with the attached end 11 of the locking bar. The motion, $R_3$, allows convenient positioning of the preferably rigid bar around the wheel as well as easy, reversible engagement of the free end 12 of the bar with the locking mechanism 18 of the base (locked) or the securing bracket 14 (stored).

For locking the cycle, the bar may be moved from the storage as in FIG. 2 to locked position as in FIG. 2a as follows. The free end of the bar 12 is detached from bracket 14 by a small detatching rotation of the bar along motion, $R_3$ in the plane of the frame and away from the bracket. The plane of the curved bar is then typically made perpendicular to the plane of the frame by motion about $R_2$. Next, the bar is rotated about the axis of the downtube 4, motion $R_1$, (phantom, FIG. 2a). And finally, the bar is swung around the rear wheel and the free end 12 engaged with the lock mechanism 18 through an aperture 53 in the base by an inserting motion $R_3$.

Construction and Assembly

Figure 4:
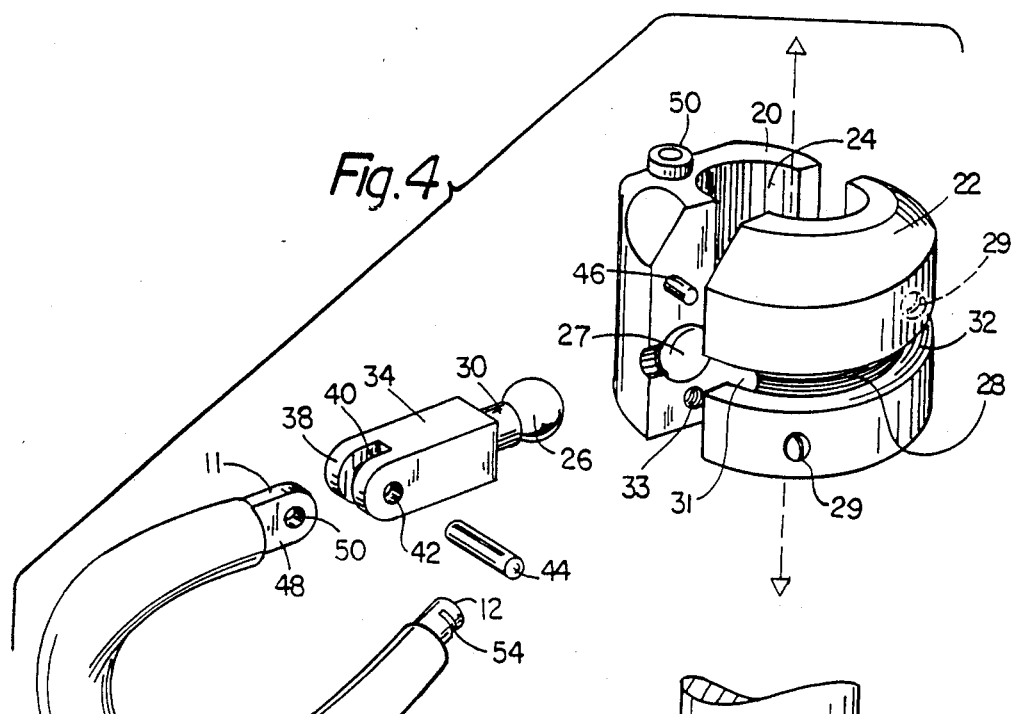
FIG. 4 is an assembly diagram of a preferred embodiment of the lock.

Referring to the cross-sectional view in FIGS. 2 and 2a and the assembly diagram, FIG. 4, in the preferred embodiment, the base is formed of two component portions 20, 22 which together define a generally cylindrical central orifice 24 sized to engage in friction fit with the downtube 4 when the portions are assembled. Holding screws 29 pass through portion 22 and mate with tapped screw holes 33 to allow assembly of the portions. Tension pins 46 prevent relative lateral motion of the portions 20, 22. The first portion 22 substantially defines the slide groove 28 in which rides the bearing 26 and the second portion 20, includes the locking mechanism 18 in which the free end 12 of the bar may be engaged.

It will be evident that for installing the lock to the downtube 4, the lock is placed in a position with the free end 11 of the bar disengaged from the locking mechanism 18. The portions 20, 22 may then be separated, positioned at the desired location and fastened about the downtube 4. It is further evident that in the locked position, the base portions 20, 22 are not separable from the downtube since locking bar, with an end attached to each portion, prohibits the motion of the portions perpendicular to the downtube and in the direction of the axes of the tensioning pins 46. The portion 22 including the track groove is preferably formed of two halves (37, 39, top and bottom, FIG. 3) which mate to form the track groove between them.

The base is formed with an opening 31 having a lip 32 about the groove 28 for attachment of the bar to the base through the rotation assembly 13. Opening 32 is sized to allow extension of pin member 30 but prevent removal of bearing 26. In this way, the motion of the bar 10 about the axes of the downtube 4, i.e., $R_1$, is enabled by sliding the bearing 26 in the groove 28 and the rotation assembly is made not removeable from the base without disassembly.

As shown in FIG. 2, it is preferable that the groove 28 extends at least to a point in the plane of the frame on the opposite side of the downtube 4 from the wheel 6, but not to a point in the plane of the wheel 6 on the wheel side of the downtube 4. Rotation of the bar about, $R_1$, to a point 3 on the opposite side of the downtube 4 from the wheel enables the bar 10 to be placed in a position in the plane of the frame 3 (plane formed by downtube 4 and crosstube 5) so that it may be stored without obstructing the pedalling of the cycle. In a preferred embodiment described herein, a portion of the track groove 27 extends into the portion 20 of the base 8 to allow proper positioning of the bar 10 in the storage position in the plane of the frame 3, as discussed. Rotation to a point 35 near the wheel 6 but outside the plane of the wheel facilitates placement of the locking bar in the locked position without obstruction of the motion of bar by the wheel 6.

The rotation about axes perpendicular to the downtube 4, the motion $R_2$, is enabled by the bearing 26 which may rotate within the track groove as the motion $R_2$ is imposed to the locking bar 10. Bearing 26, pin 30 and a piece 34 to which the bar is attached may be a single cast or turned part or an assembled heat treated piece, as known.

The mating end 38 of the piece 34 is adapted for attachment to the locking bar to allow the motion $R_3$ of the locking bar about axes, preferably perpendicular, to the axes of motion $R_2$. Slot 40 is provided in the end 38 and includes a transverse through hole 42 and a pivot pin 44 oriented in a manner perpendicular to the axis of the pin member 30. The attached end 11 of the lock bar includes flattened portion 48 with a hole 50 which mates with the slot 40 and is pivotably attached by fitting the pin 44 to the end 38. The pin 44 may be attached by a weld, press fit or the like. Preferably, the pivot pin 44 is perpendicular to the plane of the bent bar 10 as shown to enable easy attachment and detachment from the lock.

The axis of motion, $R_3$, is about the axis of the pin 44 and perpendicular to the axis of the pin 30. In this manner, for attaching and detaching the free end of the bar from the securing bracket 14 or lock mechanism 18, the bar may be rotated toward or away from either of the engaging devices. The pin 30 and piece 34 are selected to extend a distance radially from the downtube 4 to position the axis of the pin 44 such that the curved bar may be easily rotated around the tire and engaged with the lock 18 without obstruction.

Figure 5:
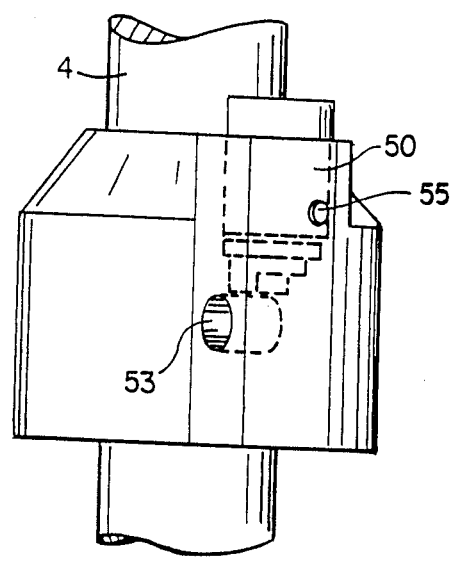
FIG. 5 is a partial view of the lock on a frame showing the lock mechanism.
Figure 6:
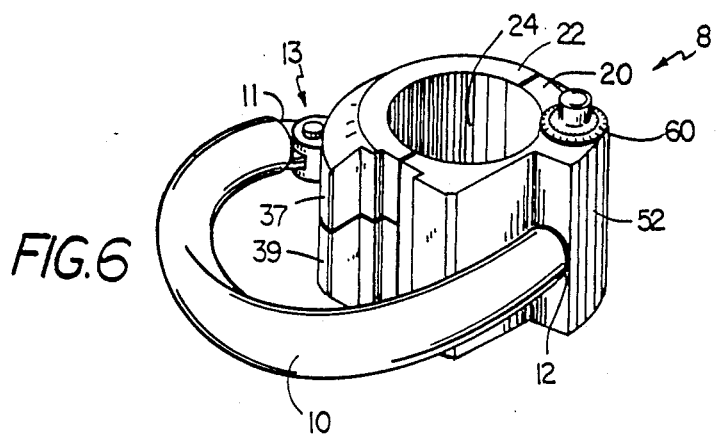
FIG. 6 is a perspective view of an embodiment including a combination lock.

The locking means 18 is preferably a purchase key 50 (FIG. 5), combination 60 (FIG. 6) lock or the like. Preferred purchase keys are the type generally known as "ACE Cylindrical" locks. The purchase key lock 50 is provided and secured in a suitable bore in an area 52 of the portion 20 of the base (FIG. 5). A securing pin 55 extend through an aperture in the base and is fixed to the lock body to prevent removal of the lock. The base has an aperture 53 for insertion of the free end 11 of the locking bar which has a locking groove 54 to mate with the lock. The locking groove 54 may mate in a similar way with the securing bracket 14 when the lock is in the storage position.

The structures described herein may be formed of steel, plastic or any other suitable material. Other modifications and variations of the present invention are also possible when considered in the light of the above teachings. It is therefore understood that the scope of the present invention is not to be limited to the details disclosed herein, but may be practiced otherwise than as specifically described. For example, it is possible that only two motions, $R_1$ and $R_2$, are required for convenient storage and locking. In this embodiment, the bar may be locked in position such that the bar is about the rear wheel between the spokes but the free end 12 does not engage the base portion 20. The bar may, for example, extend about the wheel as in the shape of a hook, a lock engaging at the attached end may be provided. Such a lock mechanism would be provided to immobilize bearing 26 at the ends of its travel in groove 28 for locking and storage.

In another embodiment, for a lock having an attached end and a free end that engages with the base, an asymetric sliding track in the base may be provided which allows motion about the downtube. The asymetric track would provide a path about the downtube that differs in radial distance from the downtube to facilitate placement of the bar about the tire and between the spokes. In this embodiment, the pivot assembly for motion $R_3$ discussed above would not be required.

It will also be understood that embodiments might include an integral base which is slid over the downtube 4. For example, this might be possible in a women's bicycle (with a frame not having a crosstube 5, see FIGS. 1, 1a) by removing the seat. It will also be understood that the base may be formed of more than two portions.

To allow motion about $R_2$, alternatively, the piece 34 may be rotateably mated to the pin member 30 to allow rotation about the axis of the pin and allow the bearing to rotate as it travels along the track groove (motion $R_1$). Similarly, the pin 30 may be rotatably attached or mated to the bearing 26.

The pin 44 may also be made parallel to the plane of the bent bar by proper shaping of the bar.

Other means for securing, locking and moving the bar, may be also used.

Other embodiments are in the claims.

What is claimed is:

1. A bicycle lock comprising:

a base member attachable to a member of a bicycle frame, near a wheel of said bicycle;

a bent locking bar a rotation assembly attached to said base and supporting said locking bar from a first end of said locking bar, said locking bar extending to a second free end adapted to pass between the spokes of said wheel, said rotation assembly constructed to permit at least two degrees of freedom of rotation of said first end of said bent locking bar, said rotation assembly including first means permitting a first said motion about an axis that corresponds to said bicycle frame member to which said base member is attachable and second means permitting a second said motion about an axis lying at a substantial angle to said first axis, said first and second means of said rotation assembly cooperatively constructed and arranged to enable said motions of said bent locking bar about said axes without detachment from said base for moving said bar between a storage position in which said bent locking bar lies substantially in the vertical plane of said bicycle frame, in position not to impeded operation of said bicycle and a locking position in which said bent locking bar lies in a plane at a substantial angle to the plane of said frame with the free end of said bar extending through the spokes of the bicycle wheel to prevent rotation of said wheel; and a lock mechanism at said frame member for locking said bar in its said locking position.

2. The lock of claim 1 wherein said free end engages with a lock mechanism.

3. The lock of claim 1 wherein said locking bar and rotation assembly are cooperatively constructed and arranged to enable engagement of the free end of said locking bar with said base when said bar is in said locking position.

4. The lock of claim 1 wherein the base is formed of separable portions and said free end of said bar, in said locking position, is engageable with said base in the manner to immobilize said portions on said frame when said bar is in said locked position.

5. The lock of claim 1 wherein said lock mechanism is disposed on said base and the free end of said bar engages said lock in said locking position.

6. The lock of claim 2, 3 or 4 including means permitting further a third motion of the outer part of said bar about an axis which lies at an angle to said axis of said second motion for moving into said lock mechanism.

7. A bicycle lock comprising:

a base member attachable to a frame member of a bicycle near a wheel of said bicycle;

a bent locking bar;

a rotation assembly attached to said base and supporting said locking bar from a first end of said locking bar, said locking bar extending to a second free end adapted to pass between the spokes of said wheel, said rotation assembly including means for permitting a first motion of said bar about said bicycle frame member to which said base member is attachable and a second motion at an axis lying at a substantial angle to said frame member, said rotation assembly constructed and arranged to enable said motions of said bar about both said frame and axis without detachment from said base to move between a storage position in which said bar does not impeded operation of said bicycle and a locking position in which said free end of said bar extends through the spokes of the bicycle wheel to prevent rotation of said wheel, said rotation assembly means including a spherical bearing attached to first end of said bar and said base includes a complementary sliding track containing said bearing, said motion about said first axis being enabled by sliding said bearing in said trach and said motion about said second axis being enabled by rotation of said bearing in said track; and a lock mechanism for locking said bar in its said locking position.

8. The lock of claim 7 wherein locking bar is articulated at a pivot spaced from the ends and allowing motion of the outer end of said bar relative to the inner end.

9. The lock of claim 1 wherein said bar is a hooked shaped bar with one end attached to said base, and said lock locks said bar from said attached end.

10. The lock of claim 1 further including a clip for engagement with said second end of said bar when said bar is in the storage position.

11. The lock of claim 1 wherein said locking member is a key lock.

12. The lock of claim 1 wherein said locking member is a combination lock.

13. A bicycle lock comprising:

(a) a base member adapted for attachment to the downtube of a bicycle frame near the rear wheel of said bicycle;

(b) a bent locking bar;

(c) a rotation assembly attached to said base and supporting said locking bar at said first end and said locking bar extending to a second free end adapted to pass between the spokes of said wheel, said rotation assembly including:

(i) a spherical bearing attached to said first end of said bar and being contained in a complementary sliding track defined by said base for enabling a first motion of said bar about said downtube by sliding said ball in said track, and, enabling a second motion about an axis, being at a substantial angle to said downtube, by rotation of said bearing in said track; and (ii) a pivot to which said locking bar is articulated, said pivot being spaced from the ends of said locking bar and enabling a third motion of said bar about an axis at a substantial angle to said axis of said second motion;

said rotation assembly constructed and arranged to enable motion of said bar without detachment from said base between a storage position in which said bar does not impede operation of said bicycle and a locking position in which said free end of said bar extends through the spokes of the wheel to prevent rotation of said wheel; and (d) a lock mechanism, contained within said base and arranged to engage said second end of said bar when in said locked position.

14. The lock of claim 13 wherein the base is formed of separable portions and said free end of said bar, in said locking position, is engageable with said base in the manner to immobilize said portions on said frame when said bar is in said locked position.

15. The lock of said claim 13 wherein said sliding track extends from a position in the plane of said bicycle frame, opposite said wheel, for placing said bar in the plane of said frame in said storage position, to a position out of said plane of said frame near said wheel but not in the plane of said wheel to enable placing said bar in said locking position without obstruction from said wheel.

16. The lock of claim 15 wherein said lock further includes a clip means attached to said downtube for engaging said second end of said bar when in said storage position.

17. The lock of claim 15 wherein said lock is a key lock.